US007421771B2

(12) United States Patent
Heathman

(10) Patent No.: US 7,421,771 B2
(45) Date of Patent: Sep. 9, 2008

(54) DEVICE FOR HOLDING A ROTATABLE PROPELLER AND METHOD OF USING SAME

(76) Inventor: Alvin G. Heathman, 16208 Applerock, O'Fallon, MO (US) 63366

(*) Notice: Subject to any disclaimer, the term of this patent is extended or adjusted under 35 U.S.C. 154(b) by 0 days.

(21) Appl. No.: 10/842,686

(22) Filed: May 10, 2004

(65) Prior Publication Data

US 2005/0000078 A1 Jan. 6, 2005

Related U.S. Application Data

(60) Provisional application No. 60/469,610, filed on May 9, 2003.

(51) Int. Cl.
*B63H 3/00* (2006.01)
*B23P 19/04* (2006.01)

(52) U.S. Cl. .......................... 29/426.5; 294/15; 294/92

(58) Field of Classification Search .................. 294/15, 294/16, 92; 29/426.5, 240, 267, 426.1; 70/18, 70/232; 416/146 R, 62; 440/49, 74, 113; 7/138; 81/10, 169
See application file for complete search history.

(56) References Cited

U.S. PATENT DOCUMENTS

| | | | | |
|---|---|---|---|---|
| 3,122,354 A | | 2/1964 | Rodeback | |
| 3,986,242 A | * | 10/1976 | Kerr | 29/261 |
| 4,061,058 A | | 12/1977 | Douglas | |
| 4,089,077 A | * | 5/1978 | Morton | 7/138 |
| 4,392,264 A | * | 7/1983 | Booe, Jr. | 7/138 |
| 4,564,991 A | * | 1/1986 | Taylor | 29/426.5 |
| 4,624,644 A | * | 11/1986 | Hall | 416/62 |
| 4,715,783 A | * | 12/1987 | Wade | 416/146 R |
| 4,850,800 A | | 7/1989 | Zygutis | |
| 4,934,037 A | | 6/1990 | Schuerg et al. | |
| 4,956,905 A | | 9/1990 | Davidson | |
| 5,184,488 A | * | 2/1993 | Sandlin | 416/62 |
| 5,333,924 A | * | 8/1994 | Furnes | 294/15 |
| D358,076 S | * | 5/1995 | Woller et al. | D8/331 |
| 5,887,460 A | * | 3/1999 | Williams | 70/232 |
| 6,048,009 A | * | 4/2000 | Sorg | 294/15 |
| 6,076,435 A | * | 6/2000 | White, Sr. et al. | 81/176.2 |
| 6,185,817 B1 | * | 2/2001 | Sims et al. | 29/426.5 |
| 6,443,515 B1 | | 9/2002 | Wu | |
| D493,692 S | * | 8/2004 | Vito et al. | D8/343 |
| 2001/0035080 A1 | | 11/2001 | Adams | |

* cited by examiner

*Primary Examiner*—Saul J. Rodriguez
*Assistant Examiner*—Paul T Chin
(74) *Attorney, Agent, or Firm*—Lewis, Rice & Fingersh, L.C.

(57) ABSTRACT

A tool comprising a handle, a shaft, and a pair of spaced-apart projections for use in removing the propeller from a watercraft. The projections are generally arranged at a distal end of the shaft so as to extend therefrom in a generally perpendicular direction. The projections may be placed over the rim of a propeller hub, rim of an exhaust port, or the lower portion of the trailing edge of the propeller blade generally close to the hub. The tool is then rotated to pinch the object placed therein between the two projections. The user can then utilize the handle and the shaft to have a lever arm with which they can use the pinch point as a grip on the propeller and manually prevent the propeller from rotating while attempting to rotate a nut holding the propeller to the watercraft with their other hand.

2 Claims, 7 Drawing Sheets

DEVICE FOR HOLDING A ROTATABLE PROPELLER AND METHOD OF USING SAME

CROSS REFERENCE TO RELATED APPLICATION(S)

This application claims priority to U.S. Provisional Patent Application Ser. No. 60/469,610, filed May 9, 2003 the entire disclosure of which is herein incorporated by reference.

BACKGROUND

1. Field of the Invention

This invention pertains to the field of hand tools. More particularly, this invention pertains to a device to hold rotating propellers such as those on boats or other watercraft to allow them to be safely removed.

2. Background of the Invention

Watercraft are an almost ubiquitous part of human society. Wherever there are open expanses of water, humans can generally be seen afloat on the surface in some form of marine vehicle. While many marine vehicles are powered by wind or direct human effort through paddling or rowing, many more watercraft are powered by motors. These motorized watercraft come in a wide variety of sizes and designs from small personal watercraft designed to carry one person to the gigantic aircraft carriers of the United States Navy.

Particularly with regards to private watercraft, regardless of the design, these watercraft are usually propelled by similar mechanisms. In particular, these watercraft utilize outboard or inboard/outboard motors which are attached to the transom. The motor is attached to a steering column (or has a simple handle attached thereto) to allow the motor to be rotated relative to the body of the watercraft.

In normal construction and when in standard operation, the motor generally comprises an engine portion which is at the top of the motor and is attached so as to ride above the water in normal operation. This engine is then connected to a generally vertical drive shaft which extends downward (generally within a housing) and passes through the surface of the water. At the bottom of the vertical drive shaft there is a connection to a horizontal drive shaft which extends generally parallel to a direction of movement. Attached about the rotational axis of the horizontal drive shaft is a propeller which comprises a generally cylindrical hub placed around the drive shaft with two or more blades projecting from the outer surface thereof at an angle to the hub. When in use, the engine drives the drive shafts causing them both to rotate about their axes. The hub then rotates about its major axis in conjunction with the horizontal drive shaft in turn rotating the blades through the water. Because of the positioning of the blades at an angle to the axis of rotation, the blades displace the water pushing the back end of the boat in a direction generally parallel to the horizontal drive shaft (or hub) of the motor.

Translation of the rotational energy from the horizontal drive shaft to the hub and therefore the blades is usually accomplished through the use of a shearable pin or friction device to allow translation of the rotational energy of the drive shaft into rotation of the propeller. Typically, the propeller will be attached to the drive shaft through the use of a retaining nut placed on the end of the drive shaft that holds the propeller on the drive shaft when in operation.

In order to remove the propeller, the nut is removed and the propeller hub can be pulled off of the drive shaft. The problem with this operation is that the drive shaft and propeller are designed to rotate together and the internal gearing generally cannot be used to lock the drive shaft (and propeller) in place when the nut is turned (whether to loosen or to tighten it). Therefore, when a user tries to rotate the nut he simply rotates the drive shaft and propeller and does not turn the nut as the rotation of the drive shaft is usually easier than the rotation of the nut relative to the drive shaft.

Because the drive shaft is generally located within the propeller hub, it is often impractical to directly prevent the drive shaft from rotating. Instead, when a user (such as a boat owner or repairman) wants to turn the nut, he will generally attempt to constrain the motion of the propeller relative to the nut, which is turn constrains the motion of the drive shaft and allows the nut to rotate relative to the drive shaft. In this way, when torque is applied to the nut, the nut can turn while the drive shaft is constrained allowing the nut to be tightened or loosened on the drive shaft.

There were a few different procedures which have been used to constrain the propeller from rotating. In the simplest one, the user grasps at least one of the blades of the propeller with his hand and he then pushes against the propeller at the same time he attempts to rotate the nut with a wrench. The combination of equal torque on both the blade in one direction and the nut in the other direction prevents the propeller and drive shaft from rotating. However, as only one direction of torque is on the nut, the nut can rotate relative the drive shaft.

The problem with this procedure is that it is quite dangerous. The blades of a propeller can be quite sharp so as to facilitate the motion of the watercraft through the water. Further, the nut will often be slightly corroded and/or may be designed to lock in place meaning that turning the nut may be very difficult at the start, but once a seal is broken it may turn very easily. It is therefore often the case that the user will grasp a blade and place a significant amount of force against the propeller and nut attempting to break the seal of the nut. When the nut suddenly begins to turn, the forces are suddenly no longer resisted and the user's hand can slip against the blade injuring him. The user's hand on the blade also may not be able to generate as much force as the user's hand on the wrench can generate (as the wrench handle serves as a lever arm allowing mechanical advantage). This can result in the user's hand being pulled into the housing of the vertical drive shaft or the anti-cavitation of the motor plate also causing injury.

To try to get around this problem of potential injury to the user's hand, the user can place a brace of some form in the propeller and the housing instead of holding the blade with their hand. This brace essentially serves as a barrier to the propeller blade to not rotate past a certain point relative the housing. In its simplest embodiment, a user may just put a board or similar object between two of the propeller blades and against the housing. As he then turns the nut, the blades wedge the board between themselves and the housing preventing movement of the propeller in the direction the user is attempting to turn the wrench and the torque applied by the user keeps the brace from moving. In more complicated embodiments, the same concept has also been used to develop devices which can be rigidly attached to the motor housing. U.S. Pat. No. 4,850,800 provides an embodiment of one such bracing device.

The problem with all these methods and devices is that they place a lot of force on the edge of the blade at the tip of the blade (where the blade is thinnest) and the blade can easily be damaged by the device being used to block the movement. Further, because of the direction of rotation of the blade, the forward edge of the blade is sometimes against the barrier. As the forward edge is often thinner than the trailing edge, the design of the forward edge is generally more sensitive to damage from this contact.

Further, braces such as these are generally held in place by mechanical means and may come loose or break as the user does not know how much force can be applied before the device will suddenly release. In these systems, the connection of the brace to the motor housing is the potential weak point of connection and this connection can slip if the user applies too much force to the nut. This can result in a sudden movement of the propeller and possibly the brace being thrown. Both of these situations can also be dangerous to the user.

Some devices have been developed for grasping the rotating blade of a lawnmower to hold that blade steady while the user removes the nut holding the blade to the lawnmower. One such device is shown in U.S. Pat. No. 4,564,991. Devices for holding lawnmower blades, however, are generally not suitable for holding propeller blades. When grasping the lawnmower blade, the devices grasp from the leading to the trailing edge of the blade (they grasp the side of the blade). For a lawnmower, the blade is very strong so this is acceptable. On a boat propeller blade, this type of grasping is likely to bend the blade which can result in severe damage to the blade rendering it unusable. Further, as a propeller blade is generally bent relative to the hub so as to provide for motive force in the water, the leading and trailing edges of the blade are spaced from each other in the direction of rotation of the propeller and they are also spaced from each other in the direction of the axis of the propeller. Therefore, grasping the leading and trailing edges simultaneously will generally result in the tool not being a lever arm in the plane of rotation, but being arranged at an angle to the rotation which makes the transfer of force less efficient.

SUMMARY

Because of these and other problems in the art, it is desirable to have a tool or device which can prevent rotation of a marine propeller (or any type of propeller) by holding it in a relatively fixed position. It is further desirable that the force applied to the propeller to hold it in the relatively fixed position be applied via a tool or device (instead of directly by a human hand) and that it be applied either at the hub, or to the trailing edge of the blade so that there is a decreased risk of damage to the propeller during the removal of the nut. it is further desirable that the blade be gripped towards its point of connection with the hub to prevent the blade itself from acting as a lever and separating the blade from the hub. Finally, it is desirable that the propeller not be held rigidly against the housing of the motor by a manner which can slip or come loose, but instead that the prevention of rotation be controlled by force exerted directly by a user.

For these reasons, and those that will become apparent, disclosed herein is a tool comprising a handle, a shaft, and a pair of spaced-apart projections. The projections are generally arranged at a distal end of the shaft so as to extend therefrom in a generally perpendicular direction. The projections may be placed over the rim of a propeller hub, rim of an exhaust port, or the lower portion of a blade close to the hub. The tool is then rotated to pinch the object placed therein between the two projections. The user can then utilize the handle and the shaft to have a lever arm with which they can use the pinch point as a grip on the propeller and manually prevent the propeller from rotating.

In an embodiment, disclosed herein is a hand tool for use when removing the propeller from a watercraft, the tool comprising: a handle capable of being grasped by a user; a linear shaft having an axis extending from said handle, said shaft having a proximal end attached to said handle and a distal end spaced therefrom; and a head, said head being arranged toward the distal end of said shaft and said head including a pair of projections with a distance between them; wherein said pair of projections extend linearly from said head in a direction generally perpendicular to said axis; and wherein said distance between said projections is chosen so that a trailing edge of a watercraft propeller can be placed between said protrusions, and said tool can be rotated about said head to bring both sides of said propeller proximate said trailing edge into contact with said protrusions.

In an embodiment of the tool, the distance is between about 0.1 and about 0.5 inches such as about 0.3 inches. In another embodiment each of said projections has a cross section in the form of a triangle with at least one rounded corner, the rounded corner on one of said projections may face the rounded corner on the other of said projections across said distance. In another embodiment, the tool is constructed of metal, such as, but not limited to, aluminum.

In another embodiment, there is disclosed, a method for removing a watercraft propeller comprising: providing a watercraft having a propeller with at least one blade, said blade having opposite leading and trailing edges and two adjacent sides, said propeller being held to a drive shaft by a nut, wherein rotation of said drive shaft causes rotation of said propeller; providing a tool having a handle, a shaft, and a head with a pair of projections which extend generally perpendicular to said shaft; placing said tool relative to said propeller such that a trailing edge of said blade is placed between said projections; rotating said tool about said head so that each of said adjacent sides of said blade proximate said trailing edge is placed in contact with one of said projections; placing a wrench on said nut; and grasping said handle and said wrench and exerting a rotational force on said nut via said wrench while resisting rotation of said propeller via said tool.

In another embodiment of the method the pair of projections each have a cross section comprising a triangle with at least one rounded corner and in the step of rotating, said adjacent sides may be in contact with said rounded corners.

In a still further embodiment, there is disclosed, a method for removing a watercraft propeller comprising: providing a watercraft having a propeller with a hub having a rim and at least one blade, said propeller being held to a drive shaft by a nut, wherein rotation of said drive shaft causes rotation of said propeller; providing a tool having a handle, a shaft, and a head with a pair of projections which extend generally perpendicular to said shaft; placing said tool relative to said propeller such that said rim of said hub is placed between said projections; rotating said tool about said head so that each of said projections is placed in contact with said rim; placing a wrench on said nut; and grasping said handle and said wrench and exerting a rotational force on said nut with said wrench while resisting rotation of said propeller with said tool.

DETAILED DESCRIPTIONS OF THE PREFERRED EMBODIMENT(S)

Figure 1:
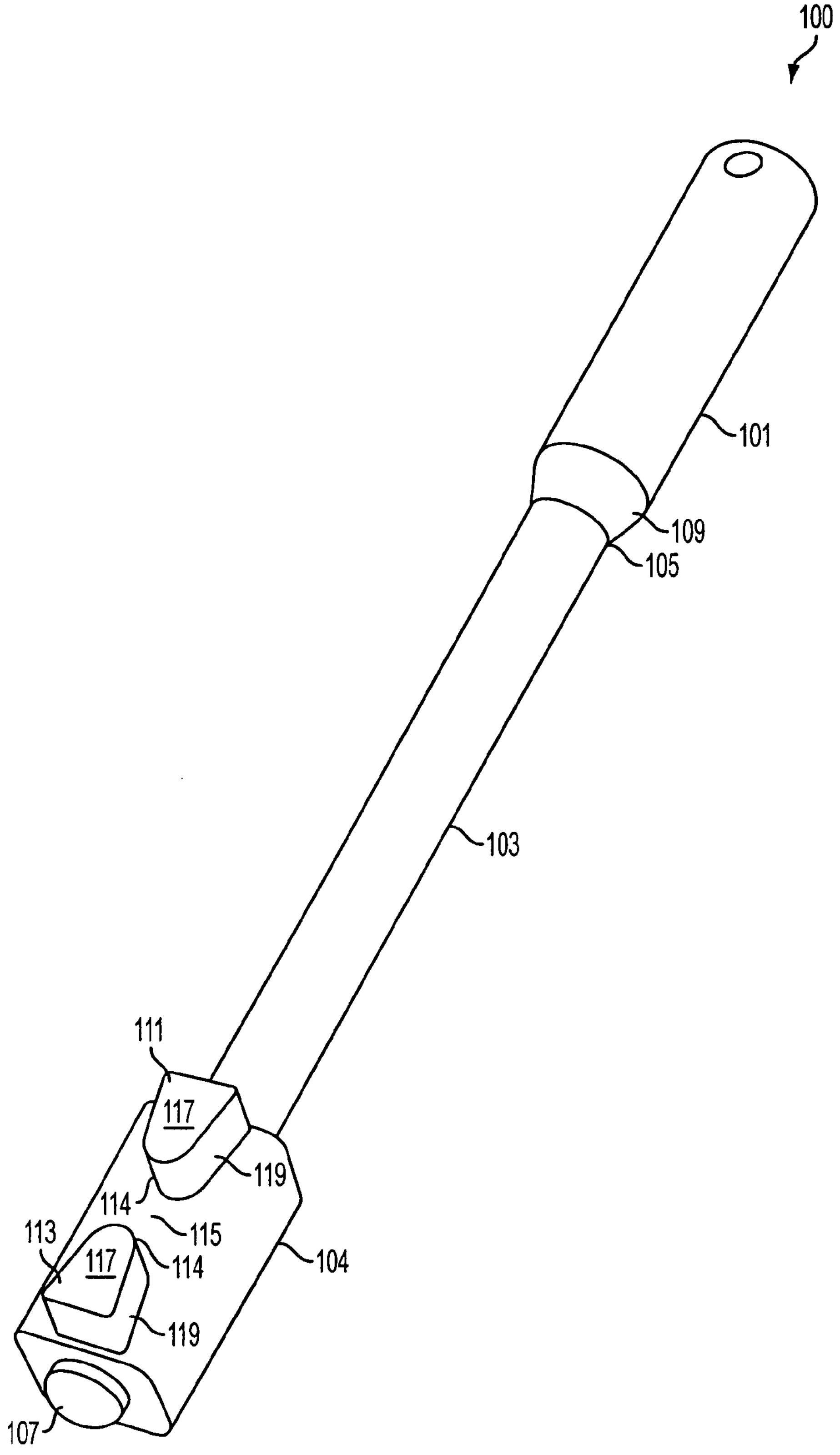
FIG. 1 shows a perspective view of an embodiment of a device for holding a rotatable propeller.
Figure 2:
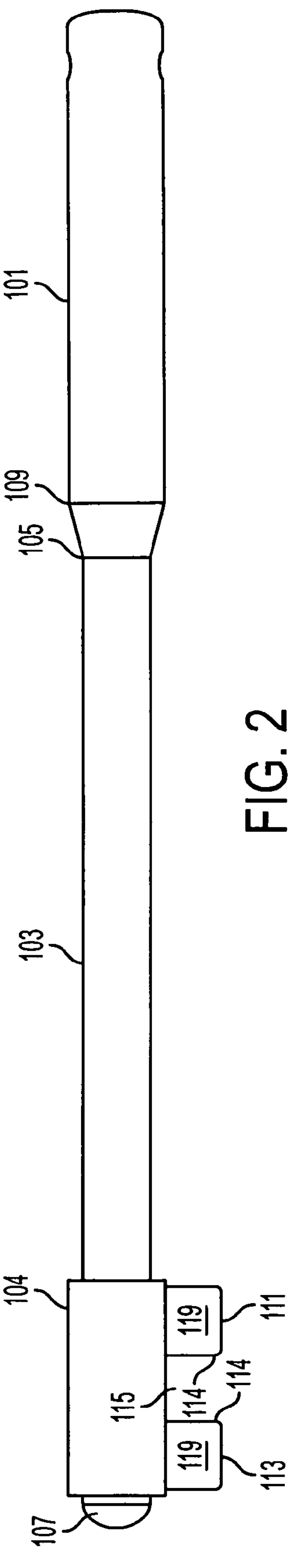
FIG. 2 shows a side view of the embodiment of FIG. 1.
Figure 3:
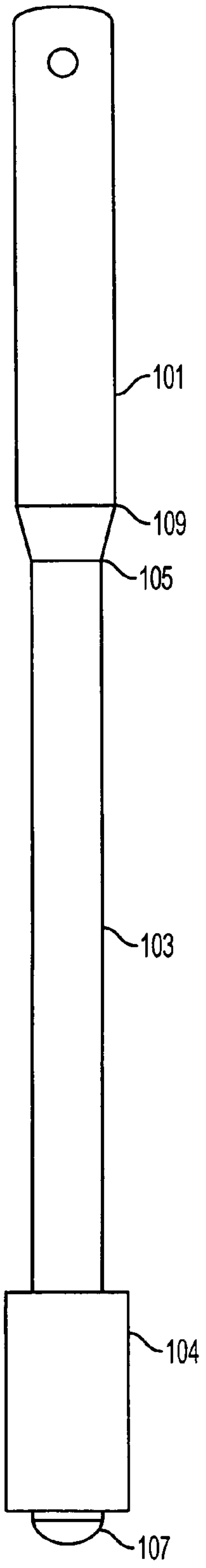
FIG. 3 shows a top view of the embodiment of FIG. 1.
Figure 4:
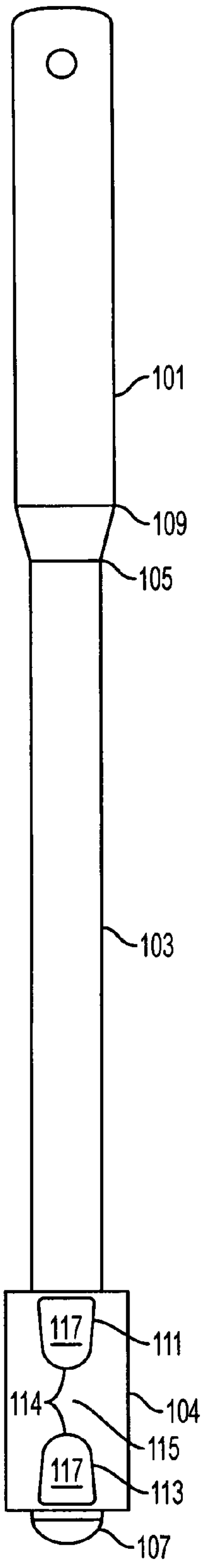
FIG. 4 shows a bottom view of the embodiment of FIG. 1.
Figure 5:
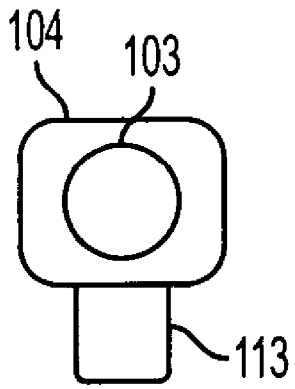
FIG. 5 shows a front view of the embodiment of FIG. 1.
Figure 6:
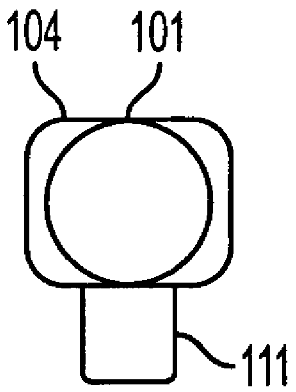
FIG. 6 shows a back view of the embodiment of FIG. 1.

FIGS. 1 through 7 provide multiple different views of a tool (100) for holding a rotatable propeller. The tool (100) generally comprises a handle (101), shaft (103), and gripping head (104). All three components will generally be constructed of metals or other strong resilient materials. It is particularly preferable that the construction be of aluminum or aluminum alloys as they provide for strength while still having sufficient give so as not to damage the propeller. The handle (101) is preferably designed to be gripped by the hand of a human being and may be sized and shaped for easy gripping. While the depicted embodiment shows the handle (101) being of generally cylindrical construction with a smooth surface, one of ordinary skill in the art would understand that the handle (101) may be of any shape graspable by the human hand.

The exterior surface of the handle (101) may include a hand grip such as one having recesses, bumps, knurling, or other texturing on the outer surface thereof. In a still further embodiment, the handle (101) may be composed of one material and have a second material placed thereon or included therein to facilitate gripping. This material could be, but is not limited to, foam, rubber, fabric, leather or other animal hide, or wood. The handle (101) will generally be of a substantially elongate shape having a length connected by two ends and having a central axis connecting the two ends, but that is by no means required.

Attached to the handle (101) is a shaft (103). The shaft (103) preferably extends linearly from the handle (101) in a manner such that a proximal end (105) of the shaft (103) is attached to the handle (101) and the distal end (107) of the shaft (103) is spaced therefrom. The shaft (103) may be of any shape or size in different embodiments, but is preferably of an elongate cylindrical shape having a central axis (108) between said proximal end (105) and said distal end (107).

In a preferred embodiment, the shaft (103) is of generally cylindrical shape having a diameter less than the diameter of the handle (101). In the depicted embodiment the shaft (103) is connected to the handle (101) via an intermediate section (109) of generally decreasing diameter, but that is by no means required and any type of connection could be used. Further, while the shaft (105) is shown herein attached to an end of the handle (101) such that the central axis (108) of the shaft (103) is collinear with the central axis of the handle (101), that is by no means required and the central axis (108) of the shaft (103) and central axis of the handle (101) could have any relationship as would be understood by one of ordinary skill in the art. These include, but are not limited to, having the two axes parallel but not collinear, having the two axes at an angle with each other, and having the two axes be normal to each other. Further, the axes may be coplanar or not depending on the embodiment.

In the depicted embodiments, the shaft (103) is depicted as being of a generally linear construction. While this construction is generally preferred to improve the performance of the lever arm in various different orientations, in an alternative embodiment, the shaft (103) may be of a non-linear shape such as by being smoothly curving, or rigidly bent. Regardless of its design, for the purpose of this disclosure, the central axis (108) of the shaft (103) will be defined as the trace connecting the proximal and distal end of the shaft (103) and going generally through the approximate center of mass of the shaft (103).

Towards the distal end (107) of the shaft (103) there is attached a head (104). The head may be a separate component attached at or toward the distal end of the shaft (103) or may simply be a portion of the shaft (103) arranged to be the head (104). If a separate component, the head (104) may be constructed of different materials from the shaft (103) to provide for improved gripping characteristics of the projections (111) and (113) as discussed below.

The head (104) includes two spaced-apart projections (111) and (113), the projections (111) and (113) are generally arranged so as to extend from the head (104) in a direction generally perpendicular to the axis of the shaft (103) at the point of attachment. In an alternative embodiment, however, the projections may be placed to project at any angle (including projecting parallel) to the central axis.

Figure 7:
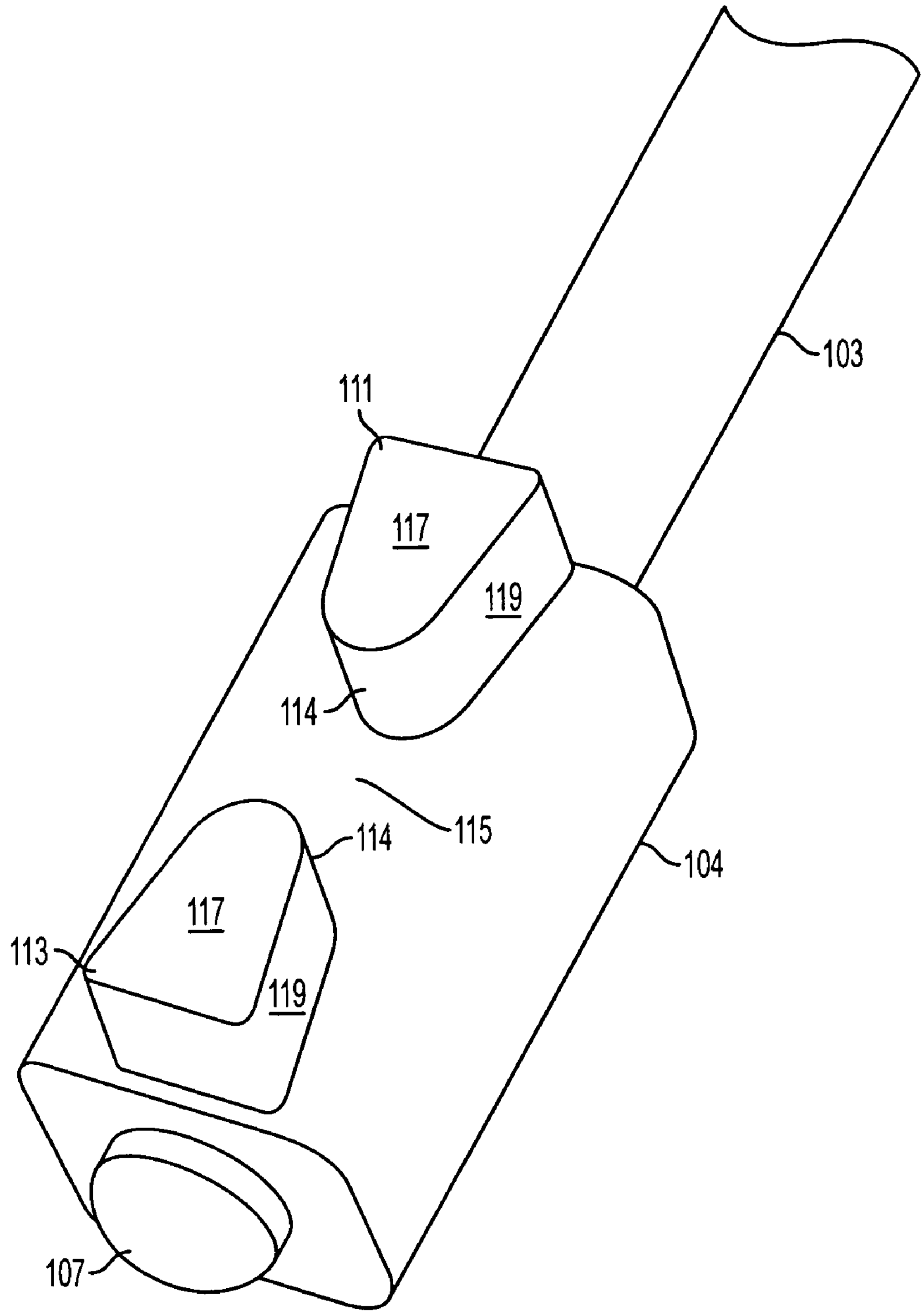
FIG. 7 shows a detail view of the shape of the projections of the embodiment of FIG. 1.

The projections (111) and (113) are arranged so as to have a predetermined distance between them the distance defining a space (115). This distance is preferably from about 0.1 to about 0.5 inches, more preferably about 0.3 inches. The projections may be of any shape and/or size extending from the shaft (103). It is generally preferred that each projection (111) and (113) have a larger cross-section than the space between them, and that each projection (111) and (113) be rigidly attached to the shaft. In the depicted embodiment, the projections each comprise an elongated protrusion having a generally triangular cross-section with a single rounded top corner (114). FIG. 7 provides the best view of a preferred embodiment of the projections looking down their elongate structure toward the shaft (103) showing one potential cross sectional shape in a magnified form.

The projections (111) and (113) will each generally have an upper surface (117) and at least one side surface (119). Some of the side surface (119) will be adjacent the space (115). In the depicted embodiment this is the portion comprising the rounded top corners (114). For the purposes of this disclosure, at least a portion of the side surface (119) of each projection (111) and (113) will be called a gripping surface. The gripping surface is defined as at least a portion of the side surface (119) which is in contact with the propeller when the tool is being used to grip the propeller. In the depicted embodiment, the gripping surface is preferably the rounded top corner (114). One of ordinary skill in the art would understand that this gripping surface may be different between different applications and tools and dependant on the exact size and shape of the propeller and tool, but that if the surface is intended to grip a propeller, it is considered a gripping surface.

In an embodiment, the gripping surface of the projection may include a material or design so as to increase friction between the gripping surface and another surface placed in contact therewith. This may be in the form of a band of material or a sheath of material placed over the projection (111) and/or (113) to essentially encircle or cover the projection (111) and/or (113). Alternatively, this material may comprise a piece of material embedded within the projection (111) and/or (113) or attached to the projection (111) and/or (113) through any manner known to those of ordinary skill in the art so as to allow the added material to influence the grip of the tool (100). In a still further embodiment, the material may comprise a coating or similar material.

In another embodiment, the gripping surface could include texturing, knurling or other surface treatments that do not comprise a new material, but increase the friction of the material of which the projections are manufactured. All of these methods may be used so as to improve the grip of the tool (100) by increasing the friction between the projections and the object to be grasped by them as is known to one of ordinary skill in the art.

In a still further embodiment, the gripping surface could include a padding surface or similar structure so as to prevent the tool (100) from damaging the structure it grips. This padding surface may be used instead of, in addition to, or may be the same as the gripping material discussed above. The padding can serve to protect the boat hub rim, exhaust port, or blade from damage during the gripping operation as discussed below.

While this disclosure has stated that various type of materials or padding could be used on the gripping surface and/or padding surface, these same materials could also or alternatively be used elsewhere on the tool such as, but not limited to, to provide for a more uniform look, to provide for a plurality of different gripping and/or padding surfaces, or for ease of manufacture.

The principle structure of the invention may be constructed from a wide array of different materials. In addition, this principle structure may have other materials mounted thereon or otherwise attached thereto to provide other benefits as would be understood by one of ordinary skill in the art. For instance, the material may be plastic with a cork portion attached thereon so as to float. It is generally preferred that materials of which the principle structure is constructed be resistant to bending or breaking when placed under force so that a torque can be applied to the handle (101) and imparted on an object placed between the projections (111) and (113) without the tool breaking. Some suitable materials include, but are not limited to, metals, woods, plastics, hard rubbers, glass, stone and similar materials.

Figure 8:
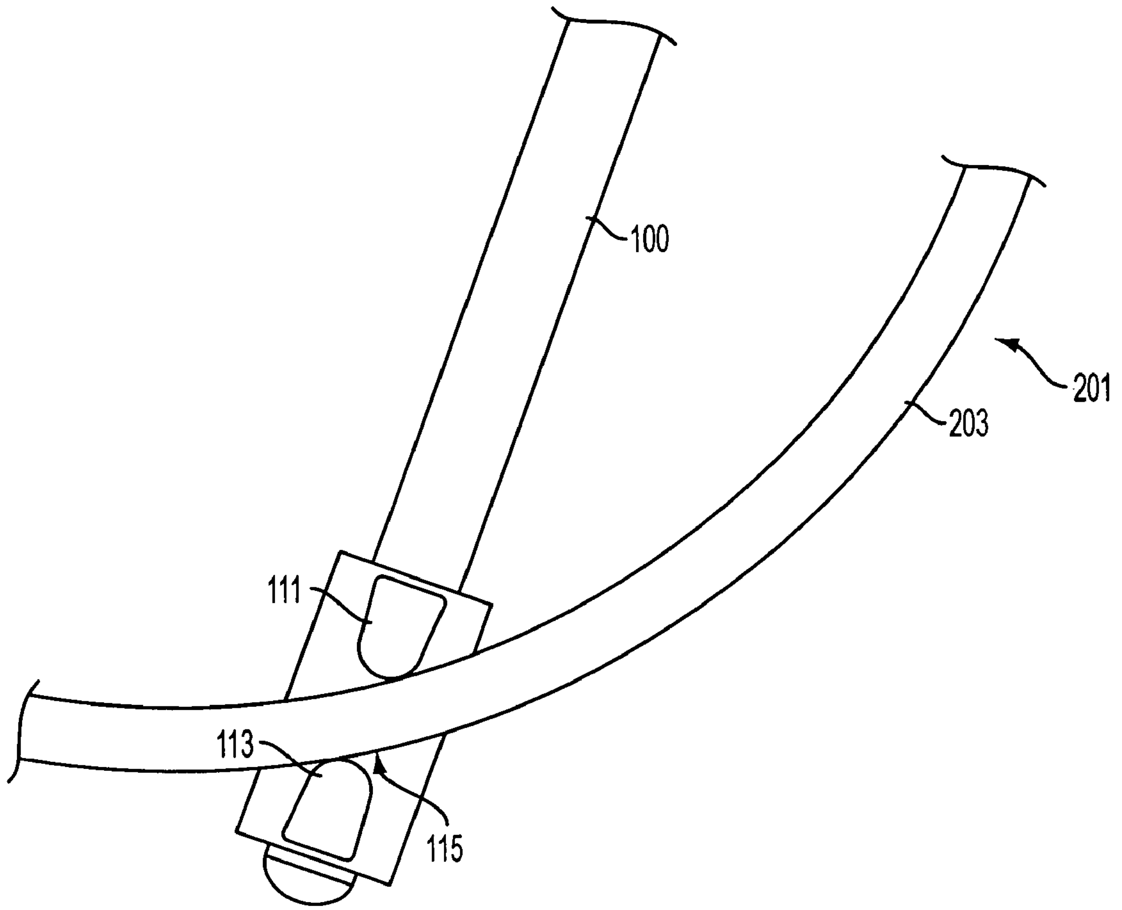
FIG. 8 shows a view of using an embodiment of a device for holding the hub of a rotatable propeller in place while the connection nut is being loosened.
Figure 9:
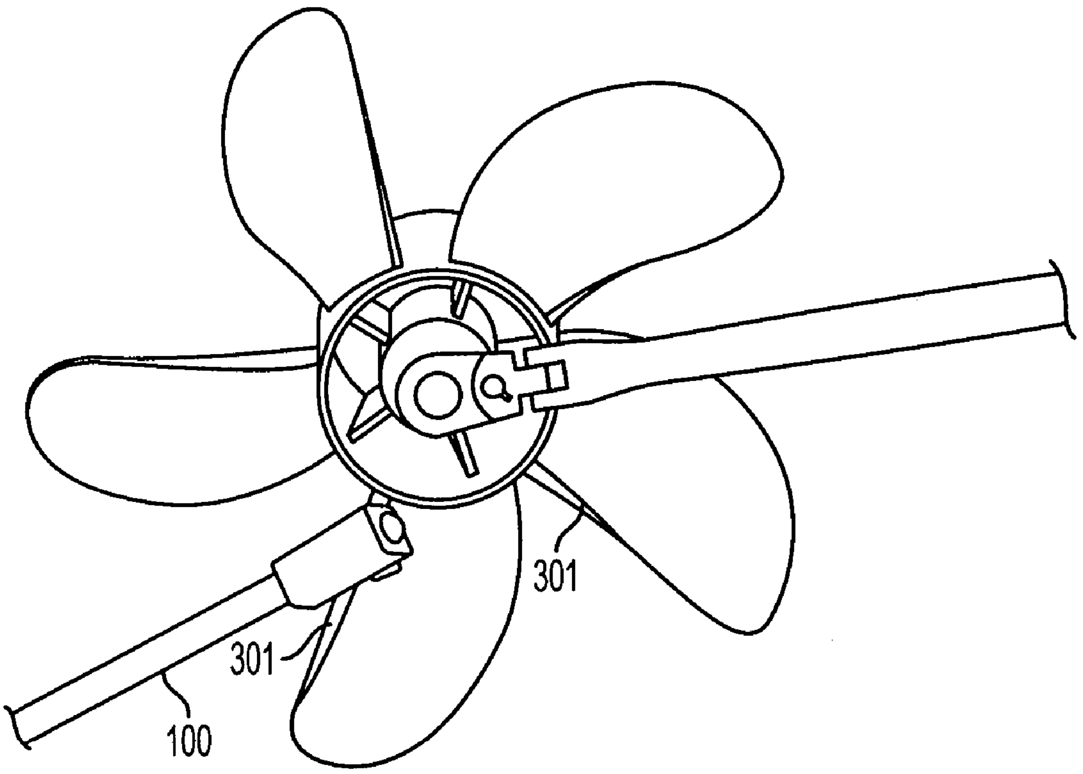
FIG. 9 shows a view of using the embodiment of FIG. 1 to hold the trailing edge of a propeller while the connection nut is being loosened.

FIGS. 8 and 9 provide for depictions of exemplary uses of an embodiment of the tool to help remove a boat propeller by allowing a user to securely grasp the hub, exhaust port, and/or trailing blade edge of the boat propeller using the tool and then turn the nut attaching the propeller to the drive shaft with their other hand.

Shown in FIG. 8 is a portion of the hub (201) which is an acceptable grasping point. FIG. 8 is not to scale in the relative sizes of the hub (201) and tool (100) so as to show detail. Generally, the hub will be a cylinder with a rim (203) encircling in raised relation the end surface. The hub (201) may also include a exhaust port which is generally a hollow structure through which the exhaust from the motor may escape. Either of these structures will generally comprise a relatively thin strip of material which extends from the propeller in a direction generally parallel to the axis of the propeller's rotation. The tool (100) is placed so that a portion of the rim or exhaust port passes through the space (115) between the projections (111) and (113). In the depicted embodiment the rim (203) is used and that will be used as exemplary for the rest of this discussion.

It is preferable that this passage occur quite easily and that the material comprising the rim (203) have a width less than the space (115) between the projections (111) and (113). It is important to note that the tool (100) is not grasping the entire rim (203) but is grasping a portion of the material forming the rim (203). Once the rim (203) is between the projections (111) and (113), the tool (100) is rotated (in the plane of the page of FIG. 8) by the user applying a force to the handle (100). This generally rotates the tool (100) about the head (104) and the projections (111) and (113) about the rim (203) until the projections (111) and (113) come into contact with the rim (203). This contact will occur at the gripping surface which in this embodiment is the rounded top corners (114).

This particular arrangement is what is shown in FIG. 8. One of ordinary skill in the art would see that at this time the rim (203) is pinched between the projections (111) and (113), which essentially hold the rim rigidly between the projections. The shaft (103) and handle (101) of the tool then extend generally tangentially from the rim and therefore are also extended in a direction parallel to the direction of rotation of the propeller. Further, because of this positioning, while the rim is pinched, a force applied to the handle (101) of the tool (100) will result in a force being applied to rotate the rim in a particular direction utilizing the structure of the tool (100) as a lever arm. In this way a user can get a strong hold on the propeller and then exert a force on the handle (101) to offset the torque applied to the nut.

Once the tool (100) is in place, a user can place a wrench on the nut holding the propeller in place. The user will then grip both the handle (101) of the tool (100) and the wrench, pushing the two tools in the opposite directions so that the propeller is held by the tool (100) as the user attempts to turn the wrench to rotate the nut.

FIG. 9 provides for a drawing of a propeller with the trailing edge (301) of a blade of the propeller grasped by the tool (100). This will generally be the preferred grasping point and the method for grasping and removing the propeller is very similar to that discussed when the rim (203) is grasped. In FIG. 9, the trailing edge (301) of a blade of the propeller is inserted into the space (115), the tool is again rotated and the protrusions (specifically again the curved top corners (114)) come into contact with the sides of the blade. As the projections (111) and (113) are relatively short they do not extend very far down the sides from the trailing edge (301). As the trailing edge is generally quite a bit stronger than the leading edge of the blade, this confines the force from the contact of the tool (100) to this stronger portion. There is very little force exerted at a distance from the trailing edge (301). This will be referred to herein as grasping the tailing edge of the blade although, to be quite exact, the sides of the blade toward the trailing edge, not necessarily the trailing edge itself is actually in contact with the projections (111) and (113).

This grasping of the trailing edge can also allow for the shaft of the tool (100) to extend in a direction relatively parallel to the tangent of the rotational motion of the propeller. In particular, it is preferred that the tool (100) be used to grasp the trailing edge (301) toward the rim (203). Because of the design of a propeller, at this point, the blade of the propeller will be arranged to extend generally radially relative to the axis of rotation allowing the handle (101) to extend relatively parallel to the tangent of rotation. Secondly, grasping the trailing edge (301) toward the hub prevents the blade itself from becoming a lever. As would be readily apparent to one of ordinary skill in the art, if force is applied to the tip of the propeller (point farthest from the hub) the blade can break from the hub from the lever action of the blade while applying the same force at the point of connection between the blade and the hub is highly unlikely to break the blade from the hub.

The spacing of the projections (111) and (113) to grasp the trailing edge of the tool and extend relatively parallel to the tangent of the rotation of the propeller is an important feature as it allows for most of the force of the user on the handle (101) to generally be rotational in the same direction of rotation as the propeller. This is both a stronger connection and an increase in force compared to having the trailing and leading edge of the blade in contact with the projections (111) and (113). The reason is clear if the motion of the propeller is examined. If the projections (111) and (113) were placed so the first projection (111) was against the trailing edge (301) of the blade and the second projection (113) was against the leading edge of the blade, the shaft (103) would extend at an angle between the propeller blades. This angle does not provide much grip for preventing rotation in the plane of the page of the propeller as a whole as only a portion of the force exerted by the user is applied in that rotational direction. Further, a significant component of the force is directed into bending of the blade relative to the hub, which can destroy the propeller. By having the tool (100) grasp at the trailing edge, or hub, the axis of the shaft (103) is also generally arranged so as to be relatively planar with the rotation of the propeller (the plane of the page of FIG. 9). This provides for improved force to hold the propeller and prevent rotation.

This placement, further, is unlikely to be able to bend the propeller blade as the force exerted by the lever motion is against a relatively strong portion of the propeller blade and is confined to a relatively small portion of the propeller blade. The grasping is accomplished in the same manner as the grasping of the rim (203) with the trailing edge (301) of the propeller blade being pinched between the gripping portions of the protrusions (111) and (113) generally at a point toward the hub.

Regardless of which point of grasp is used (FIG. 8 or 9), the tool (100) holds the propeller in place instead of having to use the hand directly. This can provide numerous benefits over the prior art. In particular, the tool (100) is gripping a fairly strong part of the propeller and is not directly in contact with the leading edge which could result in damage. Further, because of the length of the shaft (103) of the tool (100) the user is provided with both lever action, and, if the tool (100) slips, the user's hand is not exposed directly to any part of the propeller where it can be cut. Instead the tool (100) will take the brunt of the force.

Another advantage is that the hub (203) of the propeller, not the blade, can be gripped by the tool and even if the blade is grasped, the trailing blade edge (301) can be grasped and be grasped at a point closer to the hub (203) where the blade is generally both thicker and will not act a lever against the hub (203). As the hub (203) and trailing edge (301) are generally both of more rigid construction than the leading edge of the blade, there is less chance of damage to the propeller.

While the figures included herewith provide for an embodiment of the invention, one of ordinary skill in the art would understand that other alternative embodiments could be constructed. For instance, in the depicted embodiments, the device includes a single handle (101), in an alternative embodiment, the device could include two handles connected by a shaft (103) with the head (104) placed on the shaft (103) between the two handles. This design might be used for providing more force to hold the propeller or for larger propellers where two people may be required.

In a still further embodiment, the shaft (103) need not be a singular shaft but could comprise multiple shafts at different angles relative to each other. This could provide a cross shape, an "X" shape, or any other type of shape to the tool (100). Such a shape could confer additional mechanical advantages to the user, or could make gripping the tool (100) easier when in use.

In a still further embodiment, the tool may be arranged so that the projections (111) and (113) are adjustable. In such an embodiment the pinching action may be supplemented by a latching action from the projections (111) and (113) being moved closer together to purposefully close the space (115) about the rim (203) or trailing edge (301) without twisting the tool (100). Alternatively, the adjustment could simply allow for a wider or narrower space between the projections (111) and (113) so as to accommodate gripping objects of various different widths. Such an embodiment can further improve the lever action of the tool by having the shaft extend generally radially from the axis of rotation of the propeller.

While the invention has been disclosed in connection with certain preferred embodiments, this should not be taken as a limitation to all of the provided details. Modifications and variations of the described embodiments may be made without departing from the spirit and scope of the invention, and other embodiments should be understood to be encompassed in the present disclosure as would be understood by those of ordinary skill in the art.

The invention claimed is:

1. A method for removing a watercraft propeller comprising:

providing a watercraft having a propeller with at least one blade, said blade having opposite leading and trailing edges and two adjacent sides, said propeller being held to a drive shaft by a nut, wherein rotation of said drive shaft causes rotation of said propeller;

providing a tool having a handle, a shaft having a central axis, and a head with a pair of projections; said projections being generally in line with said central axis and extending generally perpendicular to said shaft and wherein each projection in said pair of projections has a cross section comprising a triangle with at least one rounded corner;

providing a wrench separate from said tool;

placing said tool relative to said propeller such that a trailing edge of said blade is placed between said projections and said adjacent sides are in contact with said rounded corners;

rotating said tool about said head so that each of said adjacent sides of said blade proximate said trailing edge is placed in contact with one of said projections;

placing said wrench on said nut; and maintaining said tool in said rotated position so that said contact between said adjacent sides of said blade and said projections holds said propeller in a generally fixed position while a rotational force is exerted on said nut via said wrench to remove said nut from said drive shaft.

2. A method for removing a watercraft propeller comprising:

providing a watercraft having a propeller with at least one blade, said blade having opposite leading and trailing edges and two adjacent sides, said propeller being held to a drive shaft by a nut, wherein rotation of said drive shaft causes rotation of said propeller, providing a tool having a handle, a shaft having a central axis, and a head with a single pair of projections extending generally perpendicular to said shaft wherein each projection in said pair of projections has a cross section comprising a triangle with at least one rounded corner;

providing a wrench separate from said tool;

placing said tool relative to said propeller such that a trailing edge of said blade is placed between said projections;

rotating said tool about said head so that each of said adjacent sides of said blade proximate said trailing edge is placed in contact with one of said projections and said adjacent sides are in contact with said rounded corners;

placing said wrench on said nut; and maintaining said tool in said rotated position so that said contact between said adjacent sides of said blade and said projections holds said propeller in a generally fixed position while a rotational force is exerted on said nut via said wrench to remove said nut from said drive shaft.

* * * * *